(12) United States Patent
Hall

(10) Patent No.: US 6,419,098 B1
(45) Date of Patent: *Jul. 16, 2002

(54) NESTABLE AND/OR LIFTABLE RACK

(76) Inventor: Donald M. Hall, 19 Progress St., Kingston, NY (US) 12401-1548

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,483

(22) Filed: Apr. 25, 1997

Related U.S. Application Data

(63) Continuation-in-part of application No. 08/704,007, filed on Aug. 23, 1996, now Pat. No. 5,957,309, which is a continuation of application No. 08/386,503, filed on Feb. 10, 1995, now abandoned

(60) Provisional application No. 60/017,343, filed on Apr. 26, 1996, and provisional application No. 60/034,853, filed on Jan. 28, 1997.

(51) Int. Cl.$^7$ ................................................. A47F 5/08
(52) U.S. Cl. ................................. 211/133.1; 211/126.2; 280/79.3
(58) Field of Search ........................ 211/133.1, 151, 211/126.2, 189, 71.01, 69.9, 100, 117, 126.1; 280/79.3; 108/14, 91

(56) References Cited

U.S. PATENT DOCUMENTS 3,240,505 A * 3/1966 Schlernitzauer ........ 280/79.3 X
5,957,309 A * 9/1999 Hall ........................ 211/126.2

OTHER PUBLICATIONS

*Baxter Catalog, Stainless Oven Racks/RONDO & ELEKTRO DAHLEN OVENS* (printed in U.S.A Nov. 1, 1995), p. CT8.

*Baxter Catalog, Stainless Oven Racks/ADAM & REVENT OVENS* (printed in U.S.A. Nov. 1, 1995), p. CT9.

*Baxter Catalog, Stainless Oven Racks/For BAXTER ADVANTAGE 2 OVENS—fits 18"×26" pans* (printed in the U.S.A. Feb., 1992), Form CT 11 (one page).

* cited by examiner

*Primary Examiner*—Daniel P. Stodola
*Assistant Examiner*—Khoa Tran
(74) *Attorney, Agent, or Firm*—Shlesinger, Arkwright & Garvey LLP

(57) ABSTRACT

Rack includes a left upright frame, a right upright frame, and a connector extending between and joining the left and right frames. The connector defines at least one (1) passage extending along the left upright frame, for example, so that another rack may be nested within a volume defined by the rack for reducing storage space requirements. The rack may have its connector oriented so that the rack has a substantially Z-shaped frame, when viewed from above. Wheels may be provided to ease movement of the rack, and a lifting element may be provided on an upper portion of the rack for use with institutional and industrial lifting mechanisms.

16 Claims, 5 Drawing Sheets

NESTABLE AND/OR LIFTABLE RACK

CROSS-REFERENCE TO RELATED APPLICATIONS

This application is a continuation-in-part of application Ser. No. 08/704,007, filed Aug. 23, 1996, now U.S. Pat. No. 5,957,309, issued Sep. 28, 1999, which application Ser. No. 08/704,007 is a continuation of application Ser. No. 08/386,503, filed Feb. 10, 1995, now abandoned, and which application Ser. No. 08/704,007, claims the priority of Provisional Application No. 60/017,343, filed Apr. 26, 1996, and Provisional Application No. 60/034,853, filed Jan. 28, 1997, and each of which is incorporated herein by reference.

FIELD OF THE INVENTION

This invention relates to a rack.

More particularly, this invention relates to a rack suited for holding and supporting objects.

Specifically, the invention relates to a rack configured for nesting with other like racks.

Still further, the invention relates to a rack which not only nests with other racks, but may also be lifted up from above by conventional lifting equipment found in commercial ovens, for example.

BACKGROUND OF THE INVENTION

Known racks are expensive to manufacture, unsuited for various applications, require lots of storage space, are expensive to transport owing to their box-like, non-nestable configuration, and, heretofore, no nestable rack has been known that is both nestable and can likewise be lifted from above.

In one earlier patent, U.S. Pat. No. 5,330,064 to Hall for "Support Assembly for a Holding Rack" discloses a Z-shaped holding rack 320 in FIG. 6 thereof that works well as a rack; yet, the present invention works even better and is particularly suited for lifting by a lifting mechanism.

OBJECTS and SUMMARY OF THE INVENTION

Accordingly, it is an object of the invention to provide a rack which overcomes the drawbacks and disadvantages of prior art devices.

Another object of the invention is to provide a rack which is easily and inexpensively manufactured, requires less storage space than conventional racks, is strong, may be readily made in a knock-down form, can be constructed using less expensive materials than known racks, is easier for users to use, and/or can be provided with elements (such as runners/c-channels) on the top thereof for engaging with conventional lifting equipment.

A further object of the invention is to provide a liftable rack which is as strong as conventional liftable racks, even though it has the advantageous nesting capability of a substantially Z-shaped rack.

A still further object of the invention is to provide a rack which can be factory assembled, and shipped cost-effectively assembled, owing to the reduced volume required by each nested rack. Such leads to significant cost and energy savings.

Yet another object of the invention is to provide a rack which advantageously exploits the properties of the material used to construct the rack to yield a rack best suited to the desired maximized properties of the rack; i.e., whether the desired property be a maximization of the low weight of the finished product, the side-loading strength of the rack, the lifting capacity of the rack, or a melding of any of the above-described properties.

A further object of the invention is to provide a Z-shaped rack (when viewed from above) which nests, yet is as strong as non-nesting racks and as the intended use demands.

A still further object of the invention is to improve upon the earlier, above-named related racks, to achieve better solutions to the above-described problems.

In summary, it will be seen that the above objects have been met while achieving high nesting density of nested racks.

The attached figures illustrate various preferred embodiments of the invention.

Relative terms such as "upper", "lower", "left", and "right" are used for ease of understanding, and are not intended to be limiting.

DETAILED DESCRIPTION OF THE INVENTION

FIGS. 1–2

Figure 1:
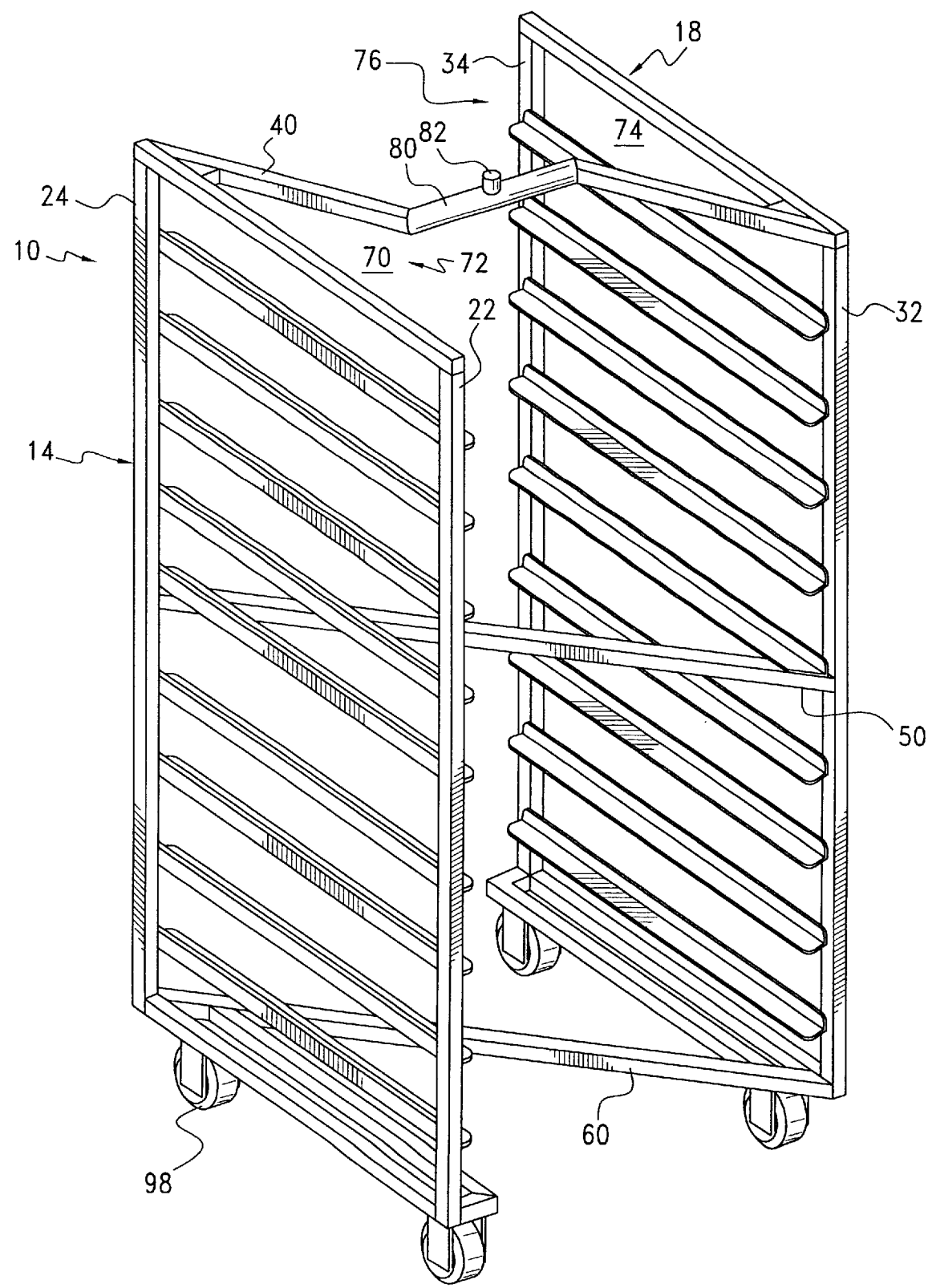
FIG. 1 is a front perspective view of a rack according to a preferred embodiment of the invention.
Figure 2:
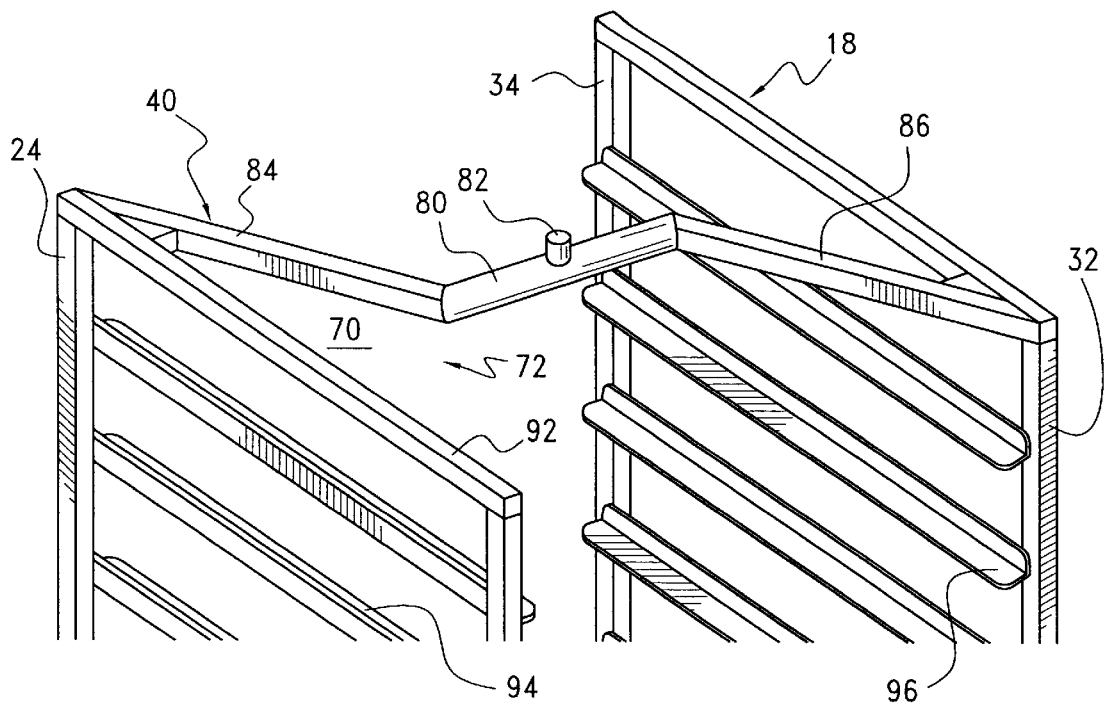
FIG. 2 illustrates an upper portion of the preferred embodiment of FIG. 1, taken on an enlarged scale.

FIGS. 1–2 illustrate a first preferred embodiment of the invention.

A rack 10 includes a left upright frame 14 and a spaced apart right upright frame 18.

Left frame 14 includes a left front post 22 and a left rear post 24. Likewise, right upright frame 18 includes a right front post 32 and a right rear post 34.

An upper connector 40 connects left frame 14, to right frame 18. Typically, upper connector 40 may be made of square tubing, and bolted, or welded, to left and right frames 14, 18, respectively.

A middle connector 50 may be provided for added strength.

In a similar fashion, a lower connector 60 may be provided at the bottom of rack 10.

A left passage 70 having a mouth 72 is defined at an upper portion of rack 10 for receiving at least one of left rear posts 24 and right front posts 32 of another rack 10, when rack 10 and another rack 10 are nested together. That is, when two racks 10 have been pushed together so as to reduce the amount of space required for storing racks 10 when not in use.

There may likewise be provided a right passage 74 having a mouth 76 defining the entrance thereof.

In a case where both left passage 70 and right passage 74 are provided, as shown in the preferred embodiment of FIGS. 1–2, it is possible to nest multiple racks 10 together in the manner illustrated schematically in FIG. 4, as will be even more apparent from the detailed description under operation below.

Still further, a lifting element 80 may be provided on rack 10.

Preferably, lifting element 80 is provided between left upright frame 14 and right upright frame 18. As illustrated, lifting element 80 may be in the form of a round tube or piece of solid steel bar stock. A stainless steel exterior covering or cladding may be provided to encase lifting element 80 when solid steel bar stock (e.g. carbon steel stock) is used.

Typically, there will be provided a guide member 82 disposed on lifting element 80. Guide member 82 may be stainless steel, or stainless steel-clad steel bar stock.

Both lifting element 80 and guide member 82 may be configured for mating with conventional lifting equipment, such as used in bakery operations.

Still further, upper connector 40 may be divided into a left arm 84 and a right arm 86 joined together by lifting element 80. It will be appreciated that left arm 84, along with a portion of a sub-member 92 of left frame 14, jointly define passage 70. Left and right arms 84, 86 may be made of double tubes or double-walled tubing.

When there are items to be supported by rack 10 such as flat trays or bakery pans, one or more runners 94, 96, may be provided on right and left frames 18, 14, respectively.

One or more casters 98 may be provided at a lower portion of rack 10 to ease movement thereof.

FIG. 3

Figure 3:
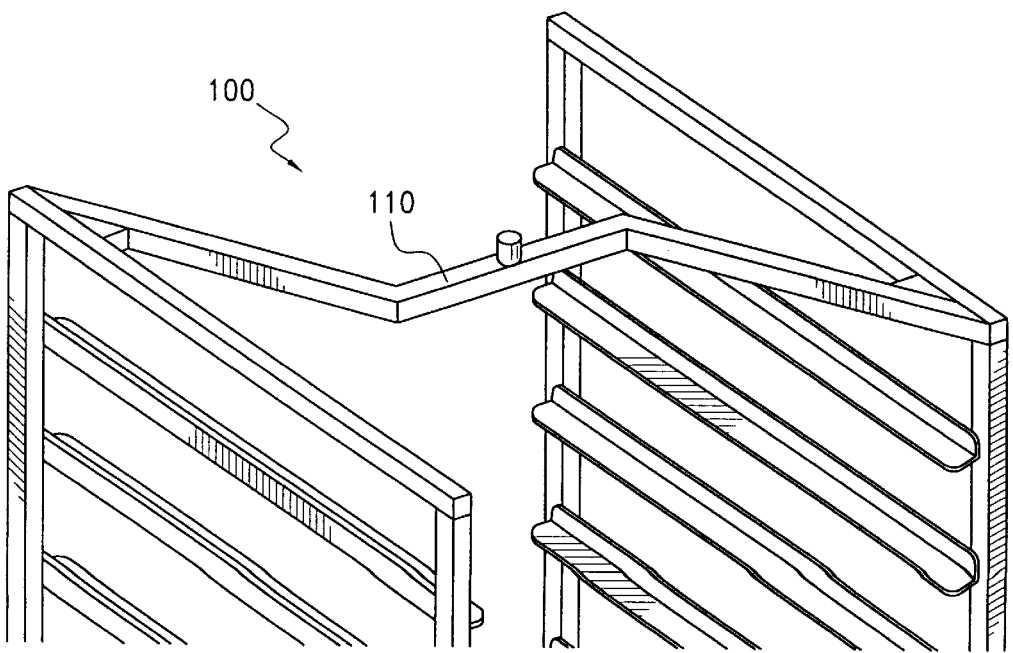
FIG. 3 is a view similar to FIG. 2, of a further preferred embodiment of a rack according to the invention.

FIG. 3 illustrates another preferred embodiment of a rack 100 in which a lifting element 110 is made of square stock, as opposed to the round or circular lifting element 80 of the embodiment of FIGS. 1–2, for example.

FIG. 4

Nesting of the racks of FIGS. 1–2 and FIG. 3 is described in detail below under OPERATION.

FIGS. 5–7

Figure 6:
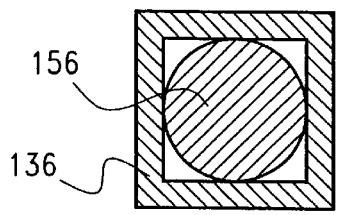
FIG. 6 is a cross-sectional view of a connecting element, taken along lines 6—6 of the preferred embodiment of FIG. 5.
Figure 7:
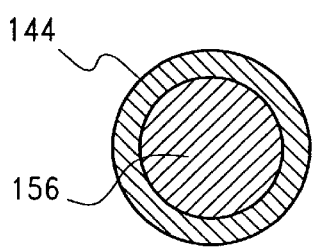
FIG. 7 is a cross-sectional view of a lifting element, taken along lines 7—7 of the preferred embodiment of FIG. 5.
Figure 5:
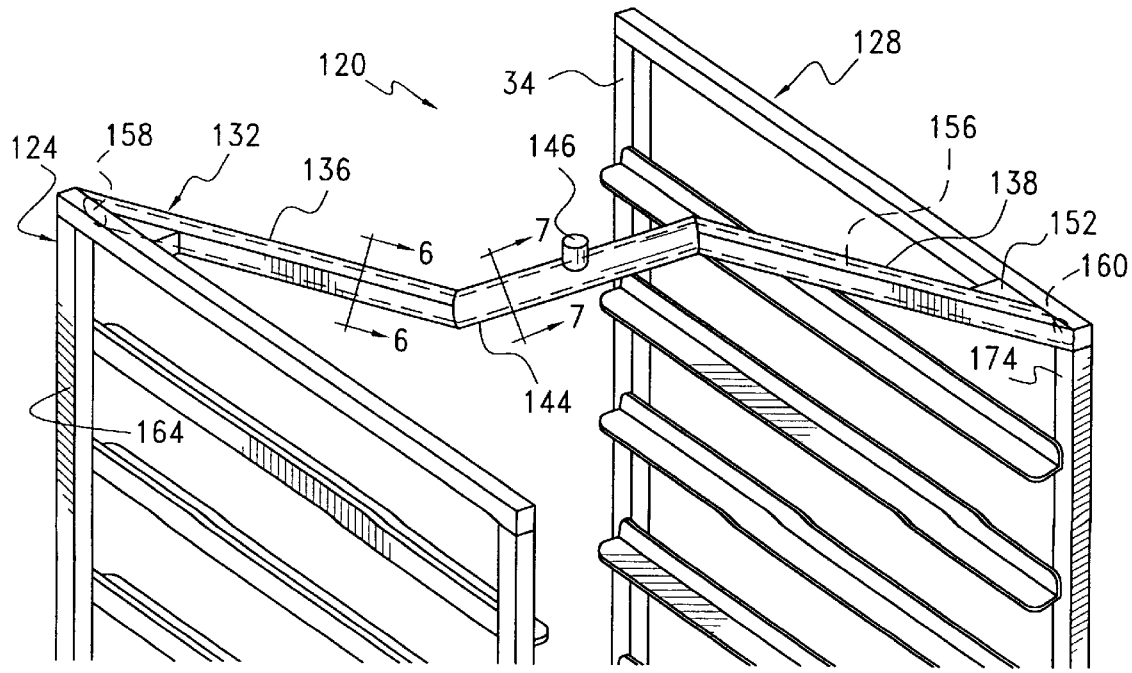
FIG. 5 is a view similar to FIG. 3, illustrating another preferred embodiment of a rack according to the invention.

Turning to FIGS. 5–7 a still preferred embodiment of the invention will be described.

A nesting rack 120 includes a left frame 124 and a right frame 128 with an upper connector 132 extending therebetween.

Upper connector 132 may be provided with a left connector element 136 and a right connector element 138 joined by a lifting element 144 in the case where rack 120 is to be used with the lifting mechanism in a bakery operation, for example.

A guide element 146 may be provided on lifting element 144 for assisting in positioning lifting element 144 and rack 120, in use.

When additional strength is required, for example, one or more gussets 152 may be provided between right frame 128 and right connector element 138, as illustrated.

Good results have been achieved when a solid round steel insert 156 is bent, as required, extends substantially the entire distance between left frame 124 and right frame 128 for strengthening the overall construction of rack 120.

Left connector element 136 and lifting element 144 may include an exterior stainless steel weldment or sheath, as may be likewise appreciated from FIGS. 6 and 7. Such stainless steel sheath, for example, is particularly desirable when rack 120 is intended for use in the food industry, institutions such as hospitals, and like applications where exterior services must be readily sanitized or rust-free.

FIG. 6 illustrates how left connector element 136 may be made of square tubing, for example, while still enclosing insert 156 having a diameter such that insert 156 snuggly engages the interior walls of the illustrated square exterior portion of left connector element 136 at at least four (4) "points" of contact.

FIG. 7 illustrates the manner in which lifting element 144 is preferably constructed of an exterior round tubing sized so that the interior wall of such round tubing snugly engages substantially the entire circumference of round insert 156.

Guide element 146 will also typically be constructed of stainless steel or like material when used in demanding environments such as bakeries and in the restaurant industry.

It will be noted that the left free end 158 and right free end 160 of insert 156 are preferably configured and disposed so that each smoothly abuts and engages a left rear post 164 of left frame 124, and a right front post 174 of right frame 128, respectively.

The use of additional middle and lower connectors, wheels, such as casters, and like elements, is contemplated for the embodiment of FIG. 5–7.

Good results have been achieved when insert 156 was made of a solid steel insert extending the entire length from left rear post 164 to front right post 174, where stainless steel tubing was used for left connecting element 136 and right connecting element 138, and round stainless steel tubing was used for at least the exterior member of lifting element 144.

Connector element 136 is shown as square tubing covering round insert 156.

Round stainless steel tubing is shown covering the round insert 156 extending through lifting element 144.

In such a case, stainless steel welds may be used for joining the intersection between the round stainless steel tubing of lifting element 144 and the square stainless steel tubing of left connector element 136, as well as the analogous intersection between the stainless steel exteriors of lifting element 144 and right connector element 138.

The operation of the embodiment of FIGS. 5–7 is analogous to the operation of the above-described preferred embodiments.

FIGS. 8–10

Figure 8:
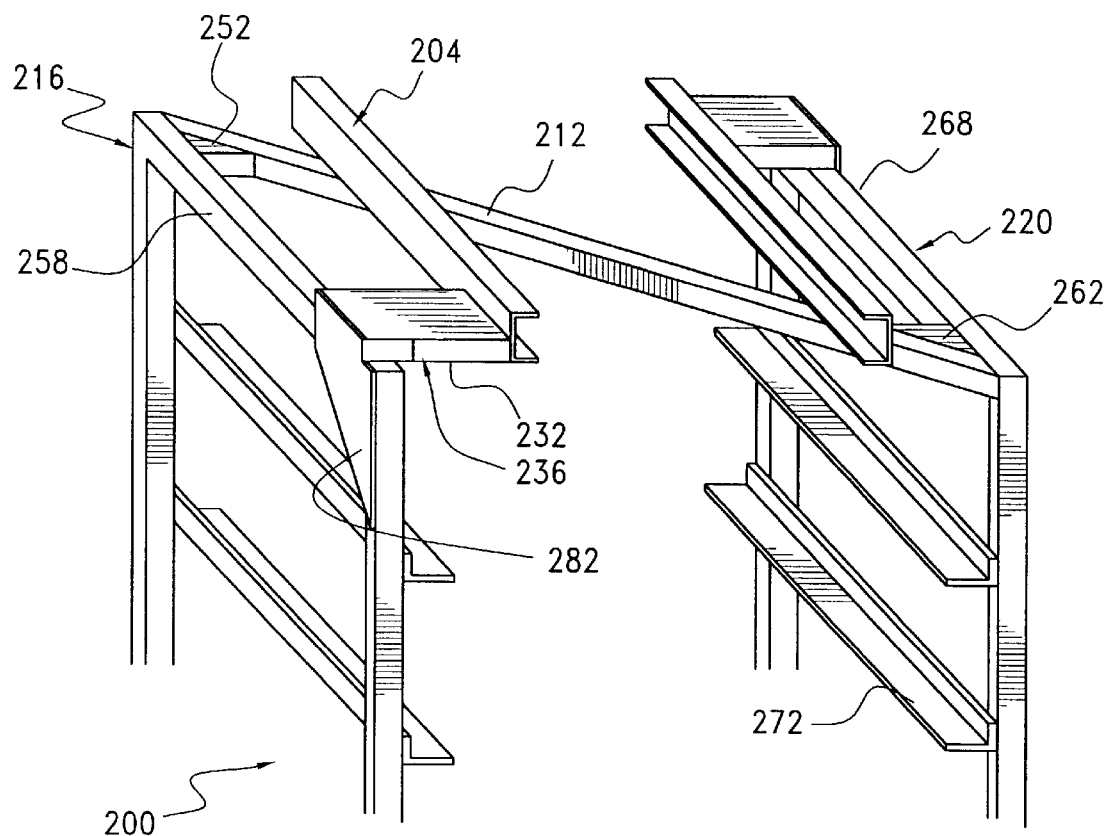
FIG. 8 is a partial, front perspective view of another preferred embodiment of a rack according to the invention.
Figure 10:
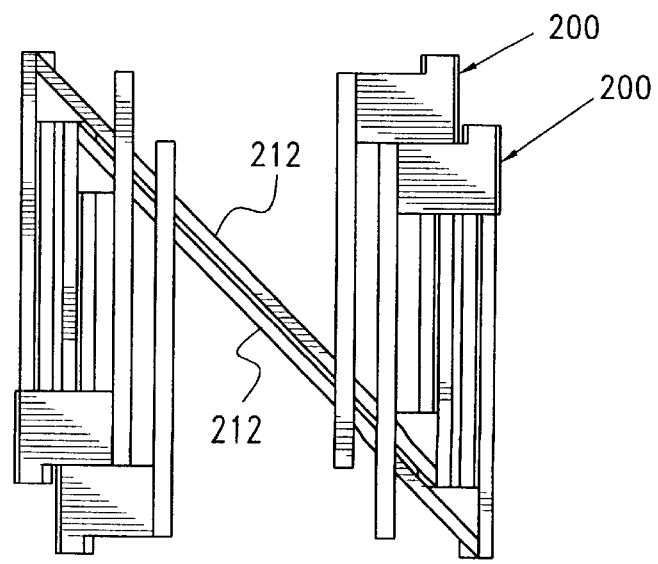
FIG. 10 illustrates the nesting of two (2) racks of the preferred embodiment of FIGS. 8–9.
Figure 9:
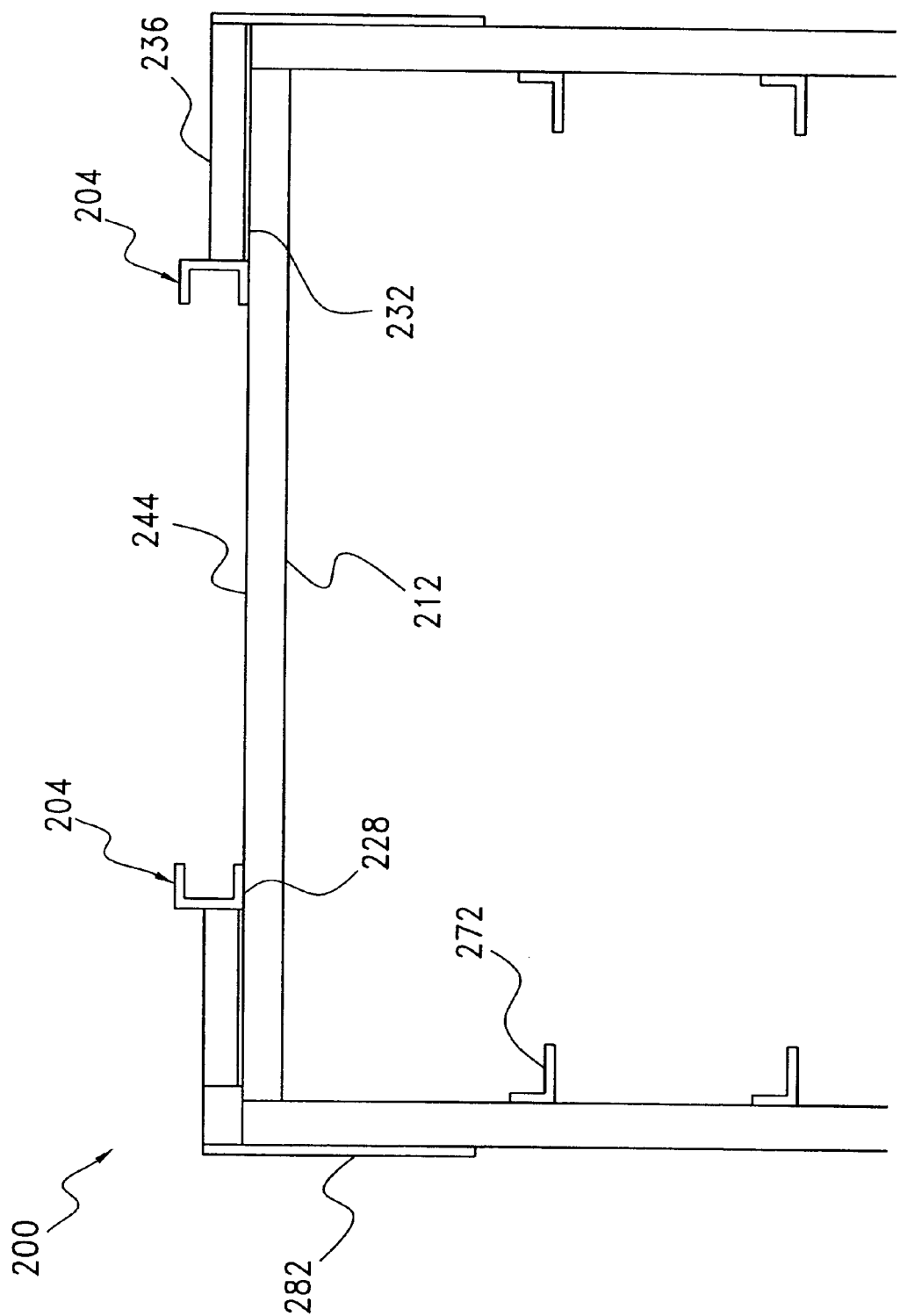
FIG. 9 is a front elevational view of the rack of FIG. 8.

The preferred embodiment of FIGS. 8–10 is a nesting Z-style oven rack 200 that is lifted from the top.

The rack 200 that is pictured fits one particular style and make of oven.

Such oven racks are used in many high volume bakeries such as are common to the supermarket and food service industry. Some oven racks are designed to be lifted while they are in the oven, others rest on the casters on which they are mounted for ease of movement. There are many different styles of lift mechanisms, and each different oven manufacturer may offer more than one style of lift for their ovens. It is contemplated that the lifting elements, rack configuration, and the like will be varied depending on the lifting mechanism requirements.

In order to achieve maximum nestability, a "C" channel 204 mounted to the top of the rack 200, which channel 204 the lifting device in the oven engages, must not interfere when two or more racks 200 are engaged by nesting them together. That is particularly difficult since "C" channel 204 must also be designed and attached to the rack in such a way that it is able to support the weight of rack 200, including the oven trays and the baked goods that commonly fill the rack during the bake cycle. This weight can be considerable, especially when a double oven rack is utilized.

Many of the oven racks that require a mechanical structure for the ovenlifting device to engage have a general configuration that is similar to the rack shown here, thus one can readily appreciate that this design can be easily adapted to most of the oven racks that require such structures.

As discussed above, "C" channel 204 must not interfere when the racks are nested. As will be appreciated, there are many other configurations for elements that can be lifted by the lifting mechanism of an oven rack, which elements are acceptable substitutes for "C" channels 204, as discussed above regarding the other embodiments, and which come within the scope of the invention.

As to the feature that "C" channel 204 and equivalents do not interfere with the nestability of rack 200, it will likewise be appreciated that there are many alternate solutions which can achieve the same function. For example, when the rack lifting mechanism (not shown) requires more room around the element to be lifted (such as the illustrated "C" channel 204) then brackets 208 can be moved up or down, for example, as necessary.

Likewise, a middle connector 212 of the Z style rack can be moved up or down as required, for example.

As will be appreciated, a left upright frame 216, a right upright frame 220, and middle connector 212 define the general Z-shape of the rack depicted.

When one rack 200 is moved closer to, and abuts, another rack for nesting, such as in the nested formation shown in FIG. 10, elements of the rack other than the two "C" channels 204 of one rack 200 must not interfere with the "C" channels 204 of another rack 200 in order for nesting to be accomplished. For example, a lower face 228 of channel 204 as well as a lower face 232 of a bracket 236 must be located above the plane containing a top face 244 of middle connector element 212.

A gusset 252 may be provided between middle connector 212 and a top left frame connector 258. An analogous gusset 262 may be provided for rigidifying the connecting intersection between right frame 216 middle connector 212.

Good results have been achieved when one or more supports 272 are provided on one or both left and right frames 216 and 220, respectively. When rack 200 is for use in a bakery, for example, supports 272 are configured to receive and support standard bakery trays.

Additional strengthening elements, such as the illustrated rigidifying member 282 may be provided, as desired.

It is likewise contemplated that other nestable racks, such as racks which are generally H-shaped, U-shaped, and X-shaped (as viewed from above) fall within the scope of the invention.

It will be readily appreciated that a variety of steels, stainless steels, metal alloys, aluminum, titanium, synthetic materials, and the like may be used to construct each of the disclosed racks, and all their components.

It is contemplated that the racks be shipped partially disassembled to the end user, and then assembled by bolting or welding together the components. Owing to the nestability of each of the embodiments of FIG. 1–10, all described racks may be shipped fully assembled.

Thirty (30) racks may be shipped in the same volume required by fifteen (15) conventional, box-like racks, which will yield significant cost-savings.

OPERATION

Figure 4:
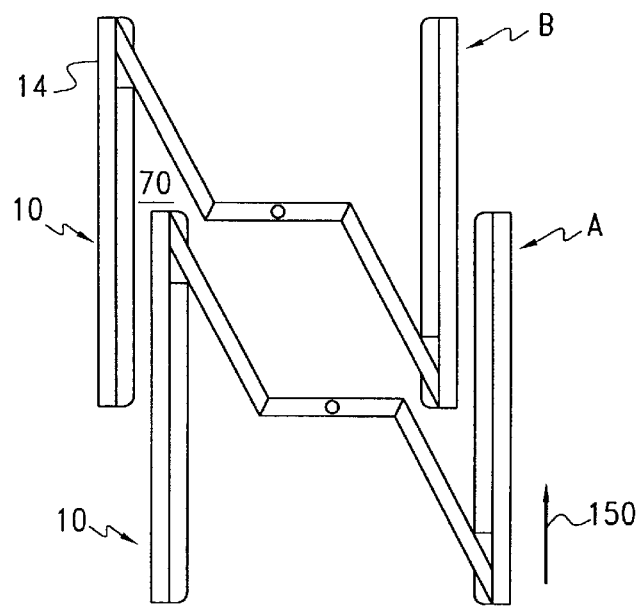
FIG. 4 illustrates schematically how the preferred embodiments of FIGS. 1–2 (and FIG. 3) nest for compact storage.

In use, the construction and operation of the preferred embodiments of FIGS. 1–2 and FIG. 3 will be readily appreciated when considering the process of nesting illustrated in FIG. 4.

Specifically, in a case where multiple racks are to be nested together, it is noted that the right front post 32 of a forward rack 10 ("A") will be inserted into left passage 70 of a rearward such rack 10 "B" when two such racks 10 ("A" and "B") are to be nested, as shown in the direction of an arrow 150. See FIG. 4. In such case, the right passage 74 of the rack A which has been inserted into the rearward rack B, will have now been placed on the left side, as viewed in the figures, and the process of nesting will continue.

The embodiments of FIGS. 5–7 nest in a similar fashion to the nesting of the embodiments of FIGS. 1–3, as shown in FIG. 4.

FIG. 10 illustrates, schematically, two (2) nested frames 200. Note that gussets 252, for example were omitted for clarity.

In summary, it will be seen that at least the stated objects and goals of the invention have been met, and other unstated improvements over the prior art have been achieved.

For example, the preferred embodiments of FIGS. 1–10 have achieved the twin goals of providing a liftable rack, which is as strong as conventional racks, and which also may be compactly nested for reduced storage space requirements when not in use.

The embodiments of FIGS. 1–7 each have substantially Z-shaped frames, when viewed from above, the central lifting element which extends substantially perpendicularly to the planes containing the left and right frames yielding a somewhat jagged connector between the left and right frames that makes the appearance something other than a true Z shape.

Yet, those FIGS. 1–7 connectors provide for use of the invention with conventional lifting equipment, while maintaining overall strength, and providing the heretofor unknown compact nestability.

In use, when such racks are lifted by conventional ovens, and bakery products are being cooked thereon, the racks are typically grabbed by the central connectors, and rotated about a vertical axis passing through the guide element. Thus, strength is required as substantial forces are applied thereto.

The preferred embodiment of FIGS. 8–10 likewise achieves the goals of strength and nestability described immediately above, while maintaining a "truer" Z-shape that yields at least as much storage space savings as provided by the embodiments of FIGS. 1–7.

While this invention has been described as having a preferred design, it is understood that it is capable of further modifications, of uses and/or adaptions of the invention following in general the principal of the invention and including such departures from the present disclosure as come within the known or customary practice in the art to which the invention pertains, and as may be applied to the central features herein before set forth, all fall within the scope of the invention and of the limits of the appended claims.

What is claimed is:

1. A rack, comprising:
   a) a left upright frame;
   b) said left upright frame including a front post and a spaced apart rear post;
   c) a right upright frame spaced at a distance from said left frame;
   d) an upper connector disposed between said left frame and said right frame;
   e) said upper connector including a left arm, a right arm, and a middle -portion disposed between and connecting the left and right arms;
   f) said left arm extending from said left frame toward said right frame;
   g) said left arm extending at an acute angle relative to said left frame;
   h) said left arm and a portion of said left frame defining a passage therebetween;
   i) said middle portion being a lifting element forming a part of said upper connector, said lifting element being configured for being lifted by a piece of lifting equipment;
   j) said lifting element extending substantially perpendicularly relative to said left frame;
   k) said lifting element extending transversely relative to said left arm of said upper connector;
   l) said upper connector being disposed so as to provide substantially free access to said passage in a direction from the front to the rear of said rack; and
   m) wherein, said passage is open and sufficiently free of obstructions and sufficiently large so that a portion of a left frame and an upper connector of a further rack of the type having spaced apart left and right upright frames can be received therein for nesting together of said rack and the further rack when the further rack is moved in a direction from the front of said rack to the rear of said rack, and the upper connector of the further rack being disposed between the left and right upright frames, and the upper connector of the further rack extending at an acute angle from the left upright frame toward the right upright frame.

2. A rack as defined in claim 1, wherein:
   a) a guide member is disposed adjacent said lifting element.

3. A rack as defined in claim 2, wherein:
   a) said guide member is disposed on and extends away from said lifting element.

4. A rack as defined in claim 3, wherein:
   a) said guide member is substantially round.

5. A rack as defined in claim 1, wherein:
   a) said upper connector includes a substantially Z-shaped frame.

6. A rack as defined in claim 5, wherein:
   a) a lower connector is disposed between said left frame and said right frame;
   b) said lower connector engages at least one of said front and rear posts; and
   c) said lower connector includes a Z-shaped frame.

7. A rack as defined in claim 1, wherein:
   a) a lower connector is disposed between said left frame and said right frame;
   b) said lower connector engages at least one of said front and rear posts; and
   c) said lower connector includes a substantially Z-shaped frame.

8. A rack as defined in claim 1, wherein:
   a) said left upright frame includes a sub-member extending between said front and rear posts.

9. A rack as defined in claim 1, wherein:
   a) a lower connector is disposed between said left frame and said right frame;
   b) said lower connector engages at least one of said front and rear posts; and
   c) said lower connector engages both said front and rear posts.

10. A rack as defined in claim 1, wherein:
    a) said lifting element is disposed at about half the length of said left frame.

11. A rack as defined in claim 1, wherein:
    a) said left arm, said lifting element, and said right arm jointly comprise a rod-like member.

12. A rack as defined in claim 1, wherein:
    a) a guide element is disposed on said lifting element.

13. A rack as defined in claim 1, wherein:
    a) said lifting element includes a round rod.

14. A rack as defined in claim 1, wherein:
    a) said lifting element includes a square rod.

15. A rack as defined in claim 1, wherein:
    a) said lifting element includes an exterior tubing and an insert therein.

16. A rack as in claim 1, wherein:
    a) said right arm extends from said right frame toward said left frame, and said right arm extends at an acute angle relative to said right frame.

* * * * *